(12) United States Patent
Miyamura et al.

(10) Patent No.: US 11,899,038 B2
(45) Date of Patent: Feb. 13, 2024

(54) ACCELERATION SENSOR, ACCELERATION EVALUATION METHOD USING SAME, AND LOAD PROVIDED WITH ACCELERATION SENSOR

(71) Applicant: Resonac Corporation, Tokyo (JP)

(72) Inventors: Yasunao Miyamura, Tokyo (JP); Yasushi Kadowaki, Chiba-ken (JP); Kuniaki Yamatake, Chiba-ken (JP); Masanao Hara, Kanagawa-ken (JP); Shigeru Yamaki, Chiba-ken (JP); Hideki Ohata, Chiba-ken (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 17/785,709

(22) PCT Filed: Dec. 18, 2020

(86) PCT No.: PCT/JP2020/047344
§ 371 (c)(1),
(2) Date: Jun. 15, 2022

(87) PCT Pub. No.: WO2021/125312
PCT Pub. Date: Jun. 24, 2021

(65) Prior Publication Data
US 2023/0055947 A1 Feb. 23, 2023

(30) Foreign Application Priority Data
Dec. 20, 2019 (JP) .................................. 2019-230498

(51) Int. Cl.
*G01P 15/03* (2006.01)
*G01P 15/093* (2006.01)

(52) U.S. Cl.
CPC ............ *G01P 15/03* (2013.01); *G01P 15/093* (2013.01)

(58) Field of Classification Search
CPC .............................. G01P 15/093; G01P 15/03
See application file for complete search history.

(56) References Cited

U.S. PATENT DOCUMENTS

| 3,946,616 A | 3/1976 | Jones, Jr. et al. |
| 5,796,098 A | 8/1998 | Azzam |
| 2014/0327862 A1* | 11/2014 | Hatsusaka ......... G02F 1/133528 252/299.61 |
| 2016/0130387 A1* | 5/2016 | Sato ..................... H10N 30/857 528/361 |
| 2017/0205913 A1* | 7/2017 | Kimura ................. G06F 3/0443 |
| 2017/0276921 A1 | 9/2017 | Tanaka |

(Continued)

FOREIGN PATENT DOCUMENTS

| JP | 6-213919 A | 8/1994 |
| JP | 10-332533 A | 12/1998 |

(Continued)

OTHER PUBLICATIONS

English Translation of WO2018/038260.*
(Continued)

*Primary Examiner* — Helen C Kwok
(74) *Attorney, Agent, or Firm* — Sughrue Mion, PLLC

(57) ABSTRACT

An acceleration sensor is provided in which a sensitive color plate is provided between two polarizing plates that are in a crossed Nicol disposition, and a silver nanowire dispersion is disposed between the sensitive color plate and one of the polarizing plates.

9 Claims, 1 Drawing Sheet

(56) References Cited

U.S. PATENT DOCUMENTS

| | | | |
|---|---|---|---|
| 2018/0009665 | A1 | 1/2018 | Kawaguchi et al. |
| 2018/0190975 | A1 | 7/2018 | Ishii et al. |
| 2019/0056545 | A1 | 2/2019 | Yoon et al. |
| 2019/0277703 | A1* | 9/2019 | Valouch ............. G01J 5/20 |
| 2019/0363348 | A1 | 11/2019 | Kurita et al. |
| 2023/0025211 | A1* | 1/2023 | Miyamura ......... G01N 21/8806 |
| 2023/0027915 | A1* | 1/2023 | Miyamura ................ C08F 2/48 |

FOREIGN PATENT DOCUMENTS

| | | | |
|---|---|---|---|
| JP | 2004-107527 | * | 4/2004 |
| JP | 2014-106082 | A | 6/2014 |
| JP | 2015-10955 | A | 1/2015 |
| JP | 2015-522807 | A | 8/2015 |
| JP | 2017-181608 | A | 10/2017 |
| JP | 2019-168386 | A | 10/2019 |
| WO | 2013/184515 | A1 | 12/2013 |
| WO | 2016/129557 | A1 | 8/2016 |
| WO | 2017/002959 | A1 | 1/2017 |
| WO | 2018/047939 | A1 | 3/2018 |
| WO | WO 2018/038260 | * | 3/2018 |

OTHER PUBLICATIONS

English Translation of JP2004-107527.*
International Search Report for PCT/JP2020/047344 dated Jan. 26, 2021 (PCT/ISA/210).
International Search Report of PCT/JP2020/047478 dated Mar. 9, 2021 [PCT/ISA/210].
Seiichi Uemura, "Optical microscope", TANSO 2000, Dec. 20, 2000, pp. 451-460, vol. 2000, No. 195.
Deirdre O'Carroll et al., "Luminescent Conjugated Polymer Nanowire Y-Junctions with On-Branch Molecular Anisotropy", Adv. Mater., 2009, vol. 21, pp. 1160-1165 (6 pages total).
K Reynolds, et al., "Probe based manipulation and assembly of nanowires into organized mesostructures", Nanotechnology, 2008, vol. 19, p. 485301 (10 pages total).
H S Patel, et al., "Wavelength encoded polarization measurements for simultaneous spectral and polarimetric characterization in near field", J. Opt., 2016, vol. 18, p. 085002 (6 pages total).
Daniela Iacopino, et al., "Synthesis, optical properties and alignment of poly(9,9-dioctylfuorene) nanofibers", Nanotechnology, 2014, vol. 25, p. 435607 (7 pages total).

* cited by examiner

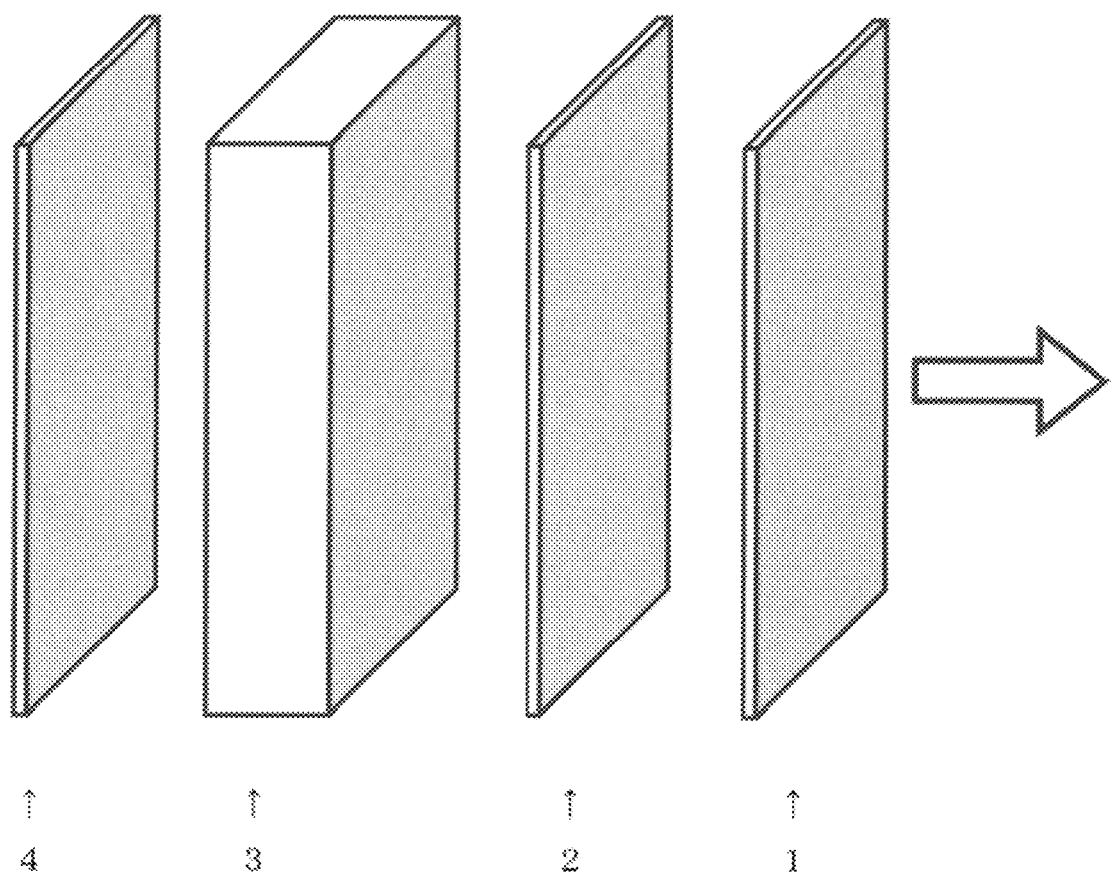

ACCELERATION SENSOR, ACCELERATION EVALUATION METHOD USING SAME, AND LOAD PROVIDED WITH ACCELERATION SENSOR

CROSS REFERENCE TO RELATED APPLICATIONS

This application is a National Stage of International Application No. PCT/JP2020/047344 filed on Dec. 18, 2020. Priority based is claimed on Japanese Patent Application No. 2019-230498, filed Dec. 20, 2019, the content of which is incorporated herein by reference.

TECHNICAL FIELD

The present invention relates to an acceleration sensor, an acceleration evaluation method using the same, and a load provided with the acceleration sensor.

BACKGROUND ART

Generally, an electrostatic capacitance method, a piezo resistance method, or the like is used for an acceleration sensor. For example, in Patent Document 1, the electrostatic capacitance method is used in which one electrode of a capacitor inside a sensor is used as a movable portion and a change in response to the acceleration thereof is electrically read from a change in the electrostatic capacitance. Further, in Patent Document 2, the piezo resistance method is used in which a resistance change of a strain gauge is electrically read and the acceleration is calculated.

CITATION LIST

Patent Documents

[Patent Document 1]
Japanese Unexamined Patent Application, First Publication No. 2014-106082
[Patent Document 2]
Japanese Unexamined Patent Application, First Publication No. 2015-010955

SUMMARY OF INVENTION

Technical Problem

In an acceleration sensor in the related art, acceleration information can be obtained from electronic information. Therefore, in order to check the acceleration with the acceleration sensor in the related art, an electronic analysis of the acceleration information is required, which requires electric power consumption.

An object of the present invention is to provide an acceleration sensor capable of visually evaluating acceleration without requiring electric power consumption.

Solution to Problem

That is, first to third aspects of the present invention have the following configurations.

[1] An acceleration sensor includes two polarizing plates disposed in a crossed Nicol disposition, a sensitive color plate, and a silver nanowire dispersion, in which the sensitive color plate and the silver nanowire dispersion are disposed between the two polarizing plates.

The first aspect of the present invention preferably includes the following features [2] to [5]. Two or more of these features can be preferably combined.

[2] The acceleration sensor according to [1], in which a solvent of the silver nanowire dispersion is water.

[3] The acceleration sensor according to [1] or [2], in which the silver nanowire dispersion has a thickness of 0.2 mm or more and 5 mm or less.

[4] The acceleration sensor according to any one of [1] to [3], in which a product of a concentration (% by mass) of silver nanowires in the silver nanowire dispersion and a thickness (mm) of the silver nanowire dispersion is 0.01% by mass×mm or more and 1% by mass×mm or less.

[5] The acceleration sensor according to [1] to [4], in which a phase difference of the sensitive color plate is 530 nm or more and 580 nm or less.

The second aspect of the present invention is the following acceleration evaluation method.

[6] An acceleration evaluation method using the acceleration sensor according to any one of [1] to [5], the acceleration evaluation method including allowing white light to be incident from an outside of one polarizing plate of the two polarizing plates, and observing a color of light emitted from an outside of the other polarizing plate.

The first aspect of the present invention preferably includes at least one of the following features [7] and [8].

[7] An acceleration evaluation method using the acceleration sensor according to [5], the acceleration evaluation method including allowing white light to be incident from an outside of one polarizing plate of the two polarizing plates, and observing a color of light emitted from an outside of the other polarizing plate, in which evaluation is made such that an acceleration direction is a fast axis direction of the sensitive color plate when the color of light is bluish-green to yellowish-green.

[8] An acceleration evaluation method using the acceleration sensor according to [5], the acceleration evaluation method including allowing white light to be incident from an outside of one polarizing plate of the two polarizing plates, and observing a color of light emitted from an outside of the other polarizing plate, in which evaluation is made such that an acceleration direction is a slow axis direction of the sensitive color plate when the color of light is red to orange.

A third aspect of the present invention is a load provided with the following acceleration sensor.

[9] A load includes the acceleration sensor according to any one of [1] to [5].

Advantageous Effects of Invention

According to the present invention, acceleration can be visually evaluated without requiring electric power consumption.

BRIEF DESCRIPTION OF DRAWINGS

The FIGURE is a diagram schematically showing the disposition of two polarizing plates, a sensitive color plate, and a silver nanowire dispersion. The arrow in the FIG. indicates an optical axis direction.

DESCRIPTION OF EMBODIMENTS

Hereinafter, an embodiment of the present invention will be described, but the present invention can be appropriately modified and implemented without changing the gist thereof.

The present embodiment will be specifically described in order to better understand the gist of the invention and is not limited to the present invention unless otherwise specified. It is possible to change, add, omit, replace, or the like the position, angle, number, material, quantity, composition, or the like within a range not deviating from the gist of the present invention.

(Acceleration Sensor)

In an acceleration sensor of the present embodiment, for example, as shown in the FIGURE, a sensitive color plate 2 is provided between two polarizing plates 1 and 4 that are in a crossed Nicol disposition, and a silver nanowire dispersion 3 is further provided between the polarizing plate 4 and the sensitive color plate 2.

That is, the polarizing plate 1 and the polarizing plate 4 are disposed such that transmission axes are orthogonal to each other.

The silver nanowire dispersion 3 may be disposed between the polarizing plate 1 and the sensitive color plate 2. The silver nanowire dispersion 3 and the sensitive color plate 2 can be disposed in any order.

The sensitive color plate 2 is, for example, a phase difference plate.

The silver nanowire dispersion is a dispersion in which silver nanowires are dispersed in a solvent. FIG. 1 shows an example in which the silver nanowire dispersion is contained in a transparent container. Hereinafter, the silver nanowire dispersion 3 may be referred to as dispersion 3.

The silver nanowires in the dispersion 3 have the property of being oriented along an acceleration direction. The acceleration sensor of the present embodiment uses this property to detect the orientation of the silver nanowires by using a sensitive color plate method.

In the sensitive color plate method, two polarizing plates and a phase difference plate (sensitive color plate) are disposed so as to be perpendicular to the optical axis of white light incident from a white light source (hereinafter, may be simply referred to as an "optical axis"). That is, the polarizing plate and the phase difference plate are disposed in parallel. When the polarizing plates are in the crossed Nicol disposition, the phase difference plate uses a single wavelength plate. The phase difference plate is used as the sensitive color plate 2 by disposing the fast axis (or slow axis) of the phase difference plate at an angle of 45° with respect to a polarization axis of the polarizing plate when viewed from the optical axis direction.

The sensitive color plate 2 preferably has a phase difference of 530 nm or more and 580 nm or less so that the color change can be easily seen with the naked eye. Hereinafter, unless otherwise specified, the sensitive color plate will be described using such a sensitive color plate 2. Further, the expression of the color name conforms to Japanese Industrial Standards JIS Z 8102:2001.

In the crossed Nicol state, when observed with only two polarizing plates, the light beam is blocked and it becomes dark. Further, the sensitive color plate has a fast axis direction and a slow axis direction. When the sensitive color plate is disposed between the two polarizing plates combined at orthogonal positions, it shows a vivid color as an interference color, and the interference color changes sensitively when the phase difference changes even slightly.

Examples of a medium (solvent) of the silver nanowire dispersion 3 include an organic solvent such as ethanol and water, and water is preferable from the viewpoint of ease of handling. A surfactant or the like may be added to the silver nanowire dispersion 3 in order to obtain a stable dispersion.

It is preferable that the silver nanowire dispersion 3 be contained in a transparent container because it is easy to handle. The transparent container may independently contain the silver nanowire dispersion 3 or may contain the silver nanowire dispersion 3 in combination with other members. For example, one polarizing plate of the polarizing plates 1 and 4 and the sensitive color plate 2 may be used as a part of a wall of the container for containing the silver nanowire dispersion 3. Normally, the shape of the silver nanowire dispersion is the shape of the inside of the container.

As for the thickness of the dispersion 3 (distance through which light passes through the dispersion), the thinner one can reduce the size of the acceleration sensor, the thicker one can dilute the dispersion 3 as described later so that the dispersion 3 is stably dispersed. From these viewpoints, the thickness of the silver nanowire dispersion 3 is preferably 0.2 mm or more and 5 mm or less, more preferably 0.3 mm or more and 3 mm or less, and even more preferably 0.5 mm or more and 2 mm or less.

The concentration of the silver nanowires in the dispersion 3 depends on the thickness of the dispersion 3. In order to obtain the same sensitivity (color change) as the acceleration sensor, the concentration of the silver nanowires in the dispersion 3 may become high concentration when the thickness of the dispersion 3 is thin and may become low concentration when the thickness of the dispersion 3 is thick. Therefore, a product of the concentration (% by mass) of the silver nanowires in the dispersion 3 and the thickness (mm) of the dispersion 3 may be used as an index. The product is preferably 0.01% by mass×mm or more and 1% by mass× mm or less, more preferably 0.03% by mass×mm or more and 0.5% by mass×mm or less, and even more preferably 0.1% by mass×mm or more and 0.3% by mass×mm or less.

(Acceleration Evaluation Method)

In an acceleration evaluation method of the present embodiment, by using the acceleration sensor, white light is allowed to be incident from an outside of one polarizing plate, and a color of light emitted from an outside of the other polarizing plate is observed. That is, in the acceleration evaluation method of the present embodiment, for example, when the white light is incident perpendicularly to the polarizing plate 1, the color of the acceleration sensor observed from the polarizing plate 4 side, more specifically, the color of the silver nanowire dispersion 3 is evaluated via the polarizing plate 4.

The light source of the white light may include light of a color that can be easily distinguished by the sensitive color plate 2 to be used, and examples thereof include natural light such as sunlight and artificial light such as an incandescent lamp, a fluorescent lamp, and an LED lamp. Since the light source of the white light may be natural light, the acceleration sensor of the present embodiment does not require electric power. Further, even when the light source of the white light is artificial light, the originally provided indoor lighting can be used, and from such a viewpoint, the acceleration sensor of the present embodiment does not require new electric power.

When the observed color of light is bluish-green to yellowish-green, that is, a color included in a range of bluish-green to green or a range of green to yellowish-green, the acceleration direction is evaluated to be the fast axis direction of the sensitive color plate. Further, when the observed color of light is a color included in a range of red to orange, the acceleration direction is evaluated to be the slow axis direction of the sensitive color plate, and reddish-purple such as magenta may be partially included.

When the observed color is a color included in a range of blue to bluish-purple, although there is a possibility of accelerating in the optical axis direction (perpendicular direction to the polarizing plate or the sensitive color plate), in the present embodiment, it may be evaluated that there is no acceleration. This is because the acceleration direction detected in the present embodiment is a direction represented in two dimensions in a plane perpendicular to the optical axis unless otherwise specified.

In the acceleration sensor of the present embodiment, when the viscosity of the silver nanowire dispersion to be used is high, the response to acceleration becomes slow, and conversely, when the viscosity is low, the response becomes fast. The response time of the acceleration sensor is, for example, substantially 3 minutes or more and 10 minutes or less. In a case of the acceleration sensor (0.2% by mass silver nanowire dispersion) of Example 1 described later, the response time is substantially 3 minutes. Therefore, the acceleration sensor of the present embodiment can memorize an acceleration state for several minutes immediately before. For example, when a load is provided with the acceleration sensor of the present embodiment as a tag, it is possible to determine whether the load has fallen or arrived during a few minutes of transportation, such as delivering from an automated warehouse or loading and unloading the load from a transporting vehicle.

EXAMPLES

Hereinafter, the present invention will be described in more detail with reference to Examples and Comparative Examples, but the present invention is not limited to the following Examples.

Example 1

A 0.2% by mass silver nanowire dispersion was sealed in a transparent container having an inner dimension of 20 mm in the vertical, 10 mm in the horizontal, and 1 mm in thickness. Hereinafter, in the transparent container, a direction in which one side was 20 mm may be referred to as a vertical direction, a direction in which one side was 10 mm may be referred to as a horizontal direction, and a direction in which one side was 1 mm may be referred to as a thickness direction. The 0.2% by mass silver nanowire dispersion was a liquid in which the silver nanowires were dispersed in water so as to be 0.2% by mass. As shown in the FIGURE, the polarizing plate 1 (BSP-200 manufactured by Midtown), the sensitive color plate 2 (MGR570 manufactured by MeCan), the transparent container containing and enclosing the silver nanowire dispersion 3, and the polarizing plate 4 (BSP-200 manufactured by Midtown) were disposed in this order, each thereof was overlapped and fixed without a gap, and then this was used as the acceleration sensor. The two polarizing plates were in the crossed Nicol disposition. Moreover, each of the polarization axes of the polarizing plates was disposed so as to be diagonally 45° with respect to the vertical direction of the transparent container.

Further, the sensitive color plate was disposed such that the fast axis thereof was in the vertical direction of the transparent container.

Natural light from the window was used as the light source, and the color of light transmitted through the manufactured acceleration sensor was observed. In order to observe of the color of light, white light was allowed to be incident from the outside of one polarizing plate, and the color of light emitted from the outside of the other polarizing plate was observed. When the acceleration sensor was placed such that the vertical direction of the transparent container was the perpendicular direction, the sensor became yellowish-green after substantially 3 minutes. Next, when the acceleration sensor was placed such that the horizontal direction of the transparent container became the perpendicular direction, the sensor immediately became orange and became orange until substantially 1 minute later, but became yellowish-green after substantially 3 minutes.

Next, when indoor light (LED lighting) was used as the light source, the acceleration sensor was installed such that the thickness direction of the transparent container became the perpendicular direction, and the light coming from above was observed from the lower side, the sensor became yellowish-green until substantially 1 minute later but became blue after substantially 3 minutes. That is, it was confirmed that when the thickness direction was the perpendicular direction, there was no acceleration, or there was acceleration in the optical axis direction (perpendicular direction with respect to the polarizing plate and the sensitive color plate).

These results indicate that the acceleration direction was perpendicular.

Further, it was also found that the past acceleration direction could be memorized for several minutes.

The response speed (response time) of the acceleration sensor can be measured with the naked eye, but in order to evaluate the response speed more accurately, a color tone evaluation was performed by using a UV-VIS spectrophotometer V-670 manufactured by JASCO. As a result, it was found that in a visible light area (400 nm or more and 800 nm or less), the maximum transmittance $T_{max}$=7% was obtained at $\lambda_{max}$=530 nm and the minimum transmittance $T_{min}$=1% was obtained at $\lambda_{min}$=790 nm.

Next, when the acceleration sensor was set up such that the vertical direction of the transparent container became perpendicular from a state where the transparent container of the acceleration sensor was placed still with the thickness direction as the perpendicular direction, the increase in transmittance at $\lambda_{max}$ was tracked, and the response time to reach the maximum transmittance $T_{max}$ was evaluated, and then the response time was 2.8 minutes. The results are shown in Table 1.

Examples 2 to 4

0.15% by mass (Example 2), 0.10% by mass (Example 3), and 0.05% by mass (Example 4) silver nanowire dispersions were used instead of 0.2% by mass silver nanowire dispersion. In Examples 2 to 4, the acceleration sensor was manufactured and measured in same manner as in Example 1 under other conditions. When the acceleration sensor was placed such that the vertical direction of the transparent container became the perpendicular direction, the acceleration sensor became yellowish-green to green (Example 2), became green (Example 3), and became greenish-blue (Example 4) after substantially 3 minutes.

Next, when the acceleration sensor was placed such that the horizontal direction of the transparent container of the acceleration sensor became the perpendicular direction, the acceleration sensor immediately became orange to red (Example 2), became red (Example 3), and became red to magenta (Example 4), and the above described color was maintained until substantially 1 minute later, but after substantially 3 minutes, each acceleration sensor became yellowish-green to green (Example 2), became green (Example 3), and became greenish-blue (Example 4).

Next, when indoor light (LED lighting) was used as the light source, the acceleration sensor was installed such that the thickness direction of the transparent container became the perpendicular direction, and the light coming from above was observed from the lower side, the acceleration sensor became the color included in a range of yellowish-green to green (Example 2), became green (Example 3), and became greenish-blue (Example 4) until substantially 1 minute later but became blue in all Examples after substantially 3 minutes. That is, it was confirmed that when the thickness direction was the perpendicular direction, there was no acceleration, or there was acceleration in the optical axis direction (perpendicular direction with respect to the polarizing plate and the sensitive color plate).

UV-VIS was measured on the acceleration sensors obtained in Examples 2 to 4 in the same manner as in Example 1, and the response time was evaluated. As a result, the response time was 2.8 minutes (Example 2), was 3.2 minutes (Example 3), and was 4.8 minutes (Example 4). The results are shown in Table 1.

Comparative Example 1

When the same procedure as in Example 1 was performed using a cell in which water was added instead of the silver nanowire dispersion, no change in color tone was observed, and the acceleration sensor could not be obtained. The results are shown in Table 1.

TABLE 1

| | Concentration (% by mass) | Maximum Transmittance $T_{max}$ (%) | Wavelength $\gamma_{max}$ obtaining $T_{max}$ (nm) | Minimum Transmittance $T_{min}$ (%) | Wavelength $\gamma_{min}$ obtaining $T_{min}$ (nm) | Response Time (min) |
|---|---|---|---|---|---|---|
| Example 1 | 0.20 | 7 | 530 | 1 | 790 | 2.8 |
| Example 2 | 0.15 | 8 | 500 | 0 | 710 | 2.8 |
| Example 3 | 0.10 | 10 | 470 | 0 | 630 | 3.2 |
| Example 4 | 0.05 | 13 | 460 | 0 | 590 | 4.8 |
| Comparative Example 1 | 0 | 20 | 460 | 0 | 570 | — |

INDUSTRIAL APPLICABILITY

The present invention can be usefully used for load transport management or the like.

REFERENCE SIGNS LIST

1: Polarizing plate
2: Sensitive color plate
3: Silver nanowire dispersion
4: Polarizing plate

What is claimed is:

1. An acceleration sensor comprising:
   two polarizing plates disposed in a crossed Nicol disposition;
   a sensitive color plate; and
   a silver nanowire dispersion configured to change in an orientation within the acceleration sensor due to an acceleration, wherein
   the sensitive color plate and the silver nanowire dispersion are disposed between the two polarizing plates, and
   the acceleration sensor is configured to indicate the acceleration by the sensitive color plate being configured to show an interference color that changes based on the change in the orientation of the silver nanowire dispersion due to the acceleration.

2. The acceleration sensor according to claim 1, wherein a solvent of the silver nanowire dispersion is water.

3. The acceleration sensor according to claim 1, wherein the silver nanowire dispersion has a thickness of 0.2 mm or more and 5 mm or less.

4. The acceleration sensor according to claim 1, wherein a product of a concentration (% by mass) of silver nanowires in the silver nanowire dispersion and a thickness (mm) of the silver nanowire dispersion is in a range of 0.01 to 1 unit, inclusive, wherein the unit is the concentration (% by mass) times the thickness (mm).

5. The acceleration sensor according to claim 1, wherein a phase difference of the sensitive color plate is 530 nm or more and 580 nm or less.

6. An acceleration evaluation method using the acceleration sensor according to claim 1, the acceleration evaluation method comprising:
   allowing white light to be incident from an outside of one polarizing plate of the two polarizing plates; and
   evaluating acceleration by observing a color of light emitted, based on the sensitive color plate showing the interference color, from an outside of the other polarizing plate.

7. An acceleration evaluation method using the acceleration sensor according to claim 5, the acceleration evaluation method comprising:
   allowing white light to be incident from an outside of one polarizing plate of the two polarizing plates; and
   evaluating the acceleration by observing a color of light emitted, based on the sensitive color plate showing the interference color, from an outside of the other polarizing plate, wherein
   evaluation is made such that an acceleration direction is a fast axis direction of the sensitive color plate when the color of light is bluish-green to yellowish-green.

8. An acceleration evaluation method using the acceleration sensor according to claim 5, the acceleration evaluation method comprising:
   allowing white light to be incident from an outside of one polarizing plate of the two polarizing plates; and
   evaluating the acceleration by observing a color of light emitted, based on the sensitive color plate showing the interference color, from an outside of the other polarizing plate, wherein evaluation is made such that an acceleration direction is a slow axis direction of the sensitive color plate when the color of light is red to orange.

9. A load comprising:
the acceleration sensor according to claim 1.

* * * * *